United States Patent
Hilmas et al.

(10) Patent No.: US 8,192,853 B2
(45) Date of Patent: Jun. 5, 2012

(54) METHOD FOR TOUGHENING VIA THE PRODUCTION OF SPIRAL ARCHITECTURES THROUGH POWDER LOADED POLYMERIC EXTRUSION AND TOUGHENED MATERIALS FORMED THEREBY

(76) Inventors: Greg Hilmas Hilmas, Rolla, MO (US); William Fahrenholtz, Rolla, MO (US); Jeremy Watts, Rolls, MO (US)

(*) Notice: Subject to any disclaimer, the term of this patent is extended or adjusted under 35 U.S.C. 154(b) by 730 days.

(21) Appl. No.: 12/210,131

(22) Filed: Sep. 12, 2008

(65) Prior Publication Data
US 2009/0075062 A1 Mar. 19, 2009

Related U.S. Application Data

(60) Provisional application No. 60/792,493, filed on Sep. 14, 2007.

(51) Int. Cl.
*B32B 9/04* (2006.01)
*B32B 9/00* (2006.01)
*B32B 19/00* (2006.01)
*C04B 35/00* (2006.01)
*D02G 3/00* (2006.01)

(52) U.S. Cl. ........ 428/704; 428/371; 428/698; 428/699; 501/92; 501/96.3

(58) Field of Classification Search .......... 428/325, 428/369, 371, 688, 689, 698, 699, 704; 501/87, 501/88, 92, 96.3
See application file for complete search history.

(56) References Cited

U.S. PATENT DOCUMENTS

| | | | | |
|---|---|---|---|---|
| 4,960,643 A | * | 10/1990 | Lemelson | 428/408 |
| 5,527,748 A | * | 6/1996 | Zank | 501/92 |
| 5,552,215 A | * | 9/1996 | Tredway et al. | 428/293.4 |
| 5,607,761 A | * | 3/1997 | Christensen et al. | 428/366 |
| 5,750,450 A | * | 5/1998 | Bull et al. | 501/91 |
| 5,997,832 A | * | 12/1999 | Lieber et al. | 423/249 |
| 6,110,594 A | * | 8/2000 | Pinneo | 428/408 |
| 2004/0180242 A1 | * | 9/2004 | Oguri et al. | 428/704 |
| 2007/0270302 A1 | * | 11/2007 | Zhang et al. | 501/92 |

* cited by examiner

*Primary Examiner* — Karl Group
*Assistant Examiner* — Noah Wiese
(74) *Attorney, Agent, or Firm* — Brannon Robinson Sowers Hughel & Doss PC

(57) ABSTRACT

A toughened composite material, having a first phase defining a matrix and a plurality of typically second phase particles dispersed in the first phase matrix. Each respective particle is characterized by a predetermined geometric architecture, such as a spiral shape. The presence of the geometrically distinct dispersed second phase operates to deflect and attenuate crack propagation.

4 Claims, 13 Drawing Sheets

22.2 mm

330 μm

| Composite | Matrix Composition | Temperature | Pressure |
|---|---|---|---|
| Spirals | 100 vol% $ZrB_2$ | 1900 C | 32 Mpa |
| Spirals | 100 vol% $ZrB_2$ | 2000 C | 32 Mpa |
| Spirals | 95 vol% $ZrB_2$ 5 vol% SiC | 2000 C | 32 Mpa |
| Cylinders | 95 vol% $ZrB_2$ 5 vol% SiC | 2000 C | 32 Mpa |

- $ZrB_2$ - HC Stark Grade B
- SiC - HC Stark UF-25

Fig. 5

METHOD FOR TOUGHENING VIA THE PRODUCTION OF SPIRAL ARCHITECTURES THROUGH POWDER LOADED POLYMERIC EXTRUSION AND TOUGHENED MATERIALS FORMED THEREBY

CROSS-REFERENCE TO RELATED APPLICATIONS

This application claims priority to co-pending U.S. Provisional Patent Application Ser. No. 60/972,493 filed on Sep. 14, 2007.

GRANT STATEMENT

Research leading to this invention was federally supported by grant No. FA9550-06-1-0125 from the U.S. Air Force Office of Scientific Research. The U.S. government has certain rights in this invention.

TECHNICAL FIELD

The novel technology relates generally to the materials science, and, more particularly, to a method for producing a toughened ceramic material through the dispersal of a second phase therethrough characterized by a generally spiral architecture.

BACKGROUND

Ceramic materials are typically strong in compression but are generally weak in tension or under torsional forces. Typically, ceramic materials fail in tension and/or under torsion via a crack propagation mechanism. Ceramic materials may be toughened by adding a second phase, such as carbon fibers, to form a composite material. However, the addition of such a second phase may complicate the formation process, adding expense. Further, the operating range of both phases may be very different; for example, carbon fibers may oxidize under high temperature refractory conditions and thus may not be an optimal toughening choice for refractory materials. Thus, there remains a need for a means to toughen refractory ceramic materials. The present novel technology addresses this need.

SUMMARY

The present novel technology relates generally to the toughening of refractory ceramic materials, such as zirconium diboride, and, more particularly, to a method and apparatus for preparing and forming two or more dissimilar materials into an architecture consisting of a first phase characterized by interpenetrating spirals dispersed in a second matrix phase. One object of the present novel technology is to provide an improved composite material system. Related objects and advantages of the present novel technology will be apparent from the following description.

BRIEF DESCRIPTION OF THE DRAWINGS

FIG. 5 tabularly represents several compositions of the present novel technology.

DETAILED DESCRIPTION OF THE PREFERRED EMBODIMENT

Figure 1:
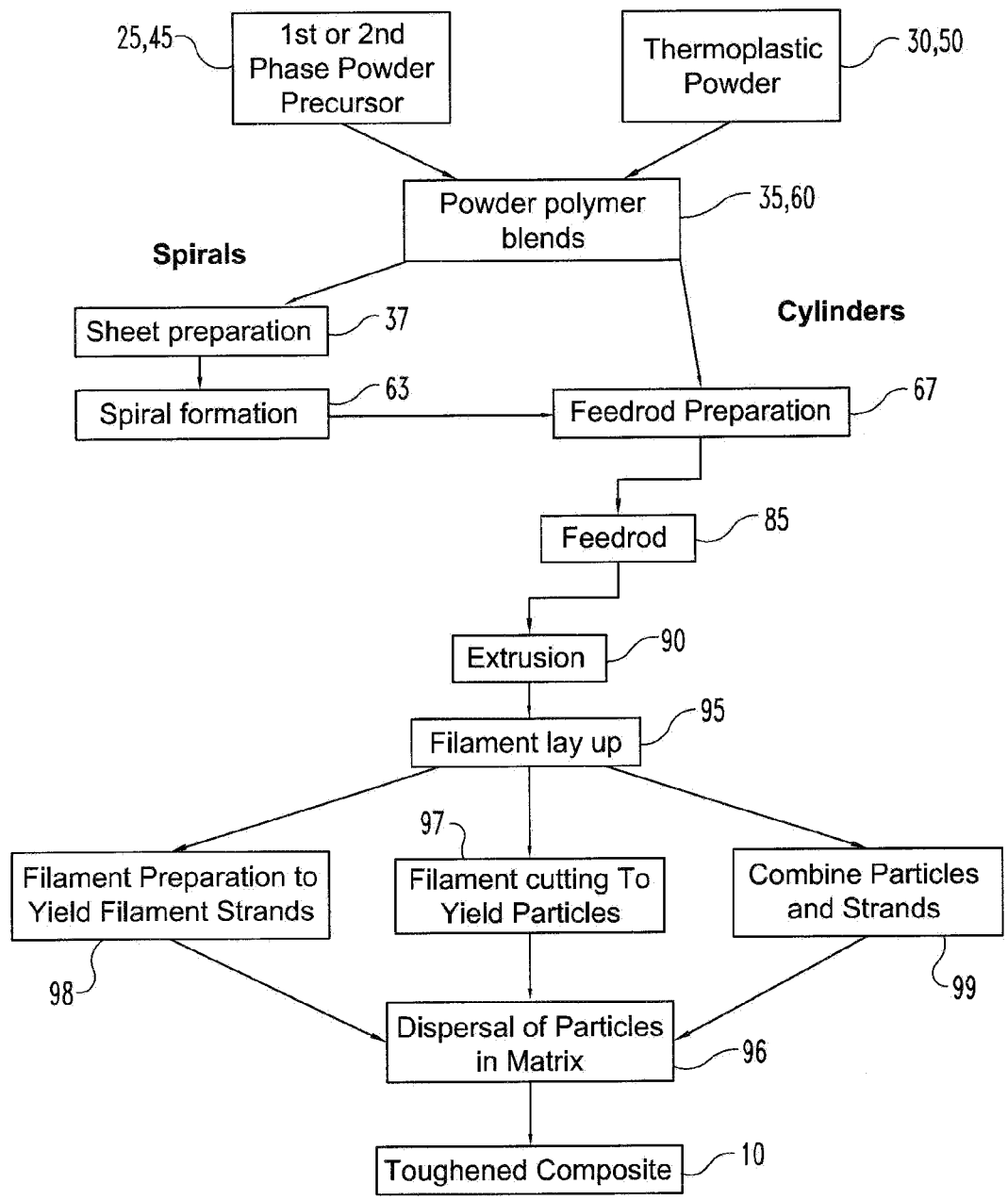
FIG. 1 schematically illustrates a process for making a composite material according to a first embodiment of the present novel technology.
Figure 2:
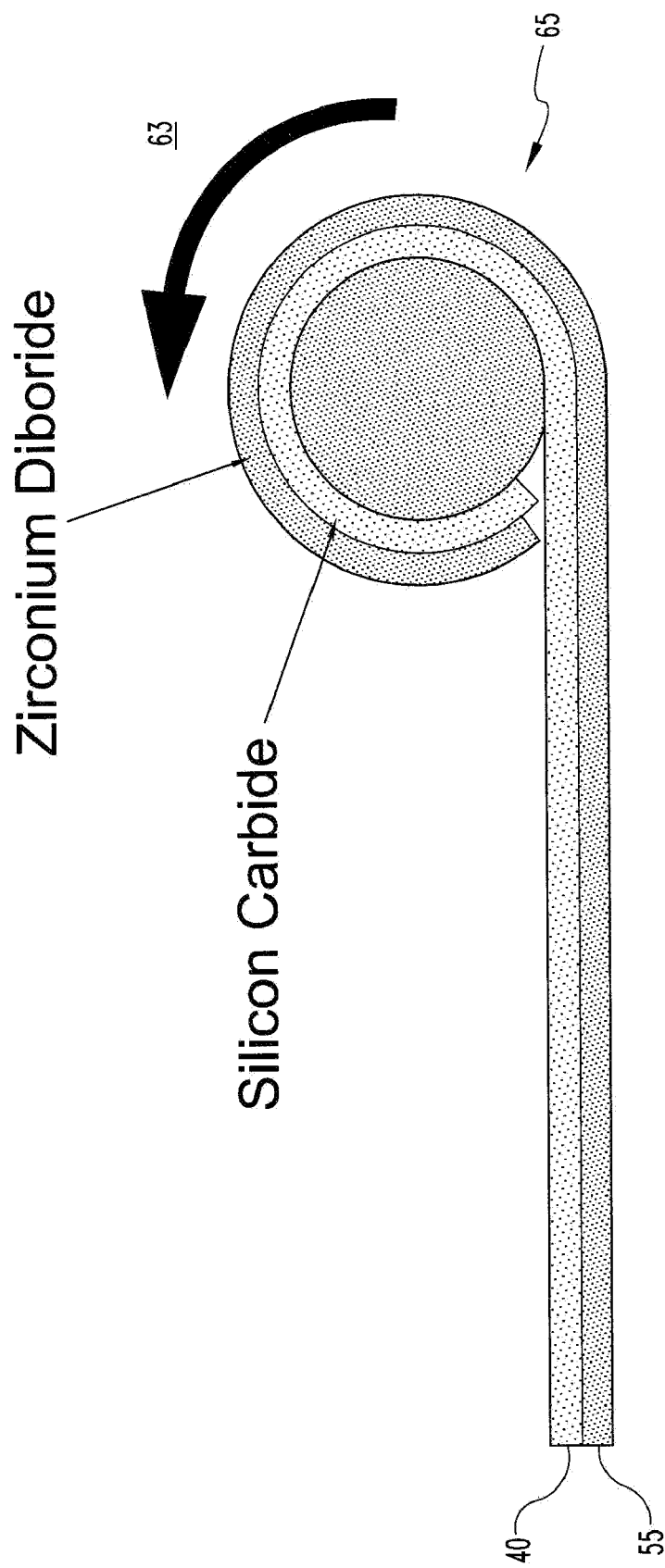
FIG. 2 is a schematic view of two sheets of materials made of respective first and second phases rolled together according to FIG. 1.
Figure 3:
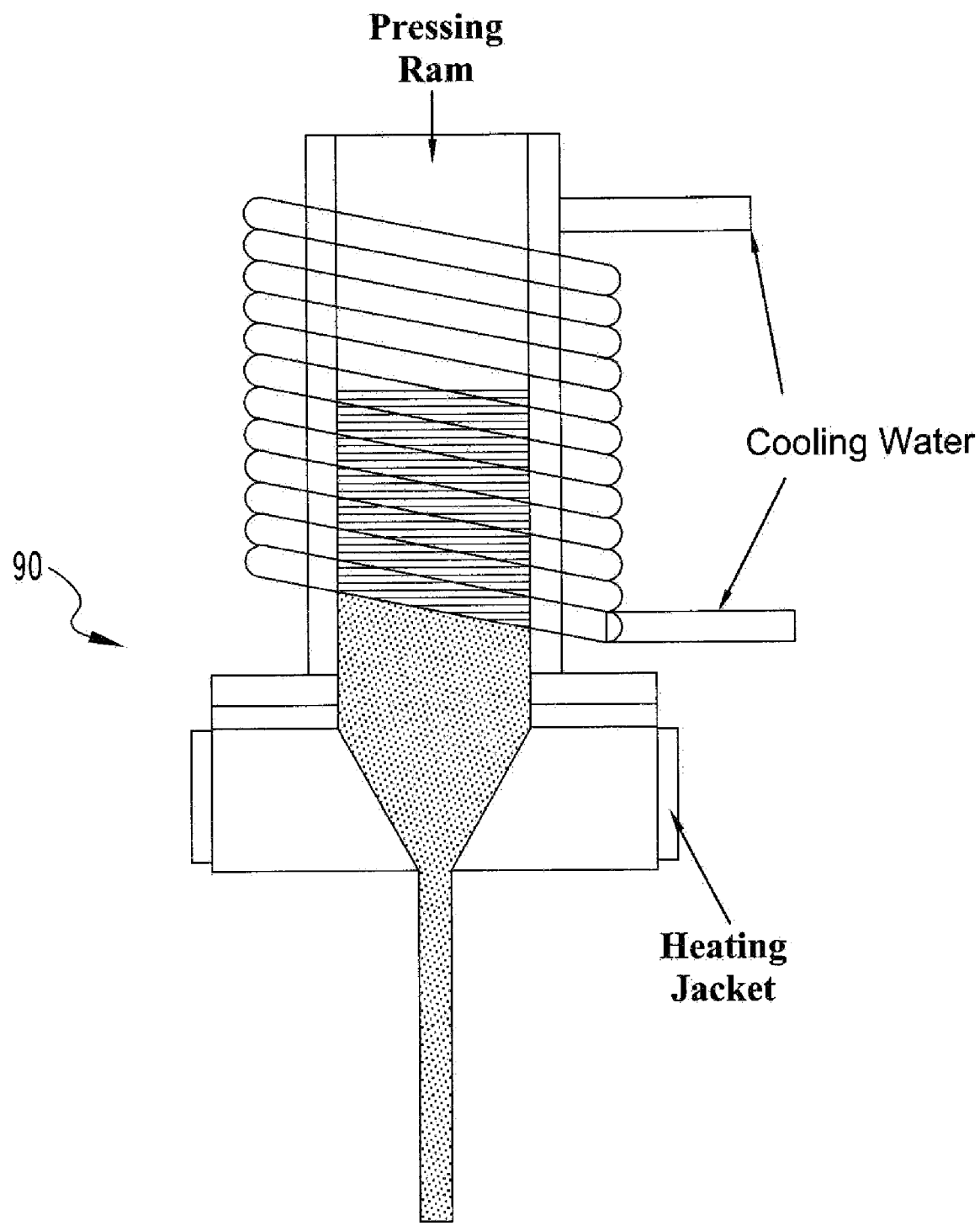
FIG. 3 is a schematic view of the extrusion step of FIG. 1.
Figure 4A:
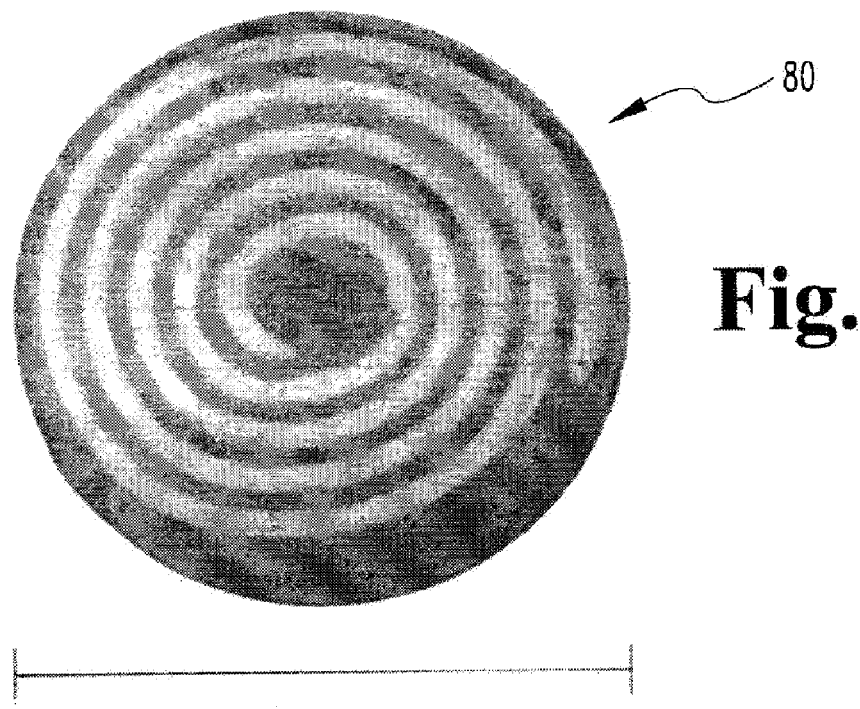
FIG. 4 is an enlarged photographic view of the rolled spiral sheets of FIG. 1.
Figure 4B:
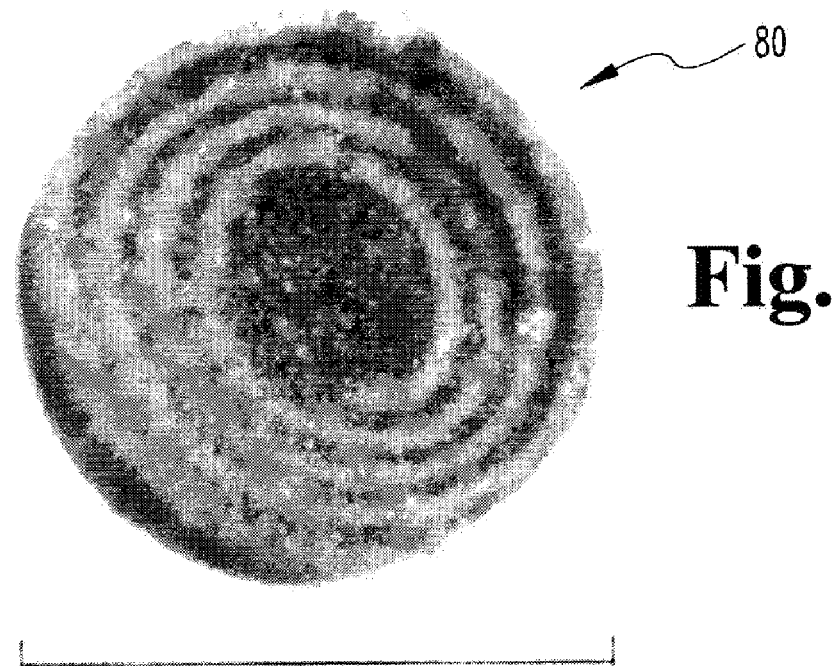
Figure 6:
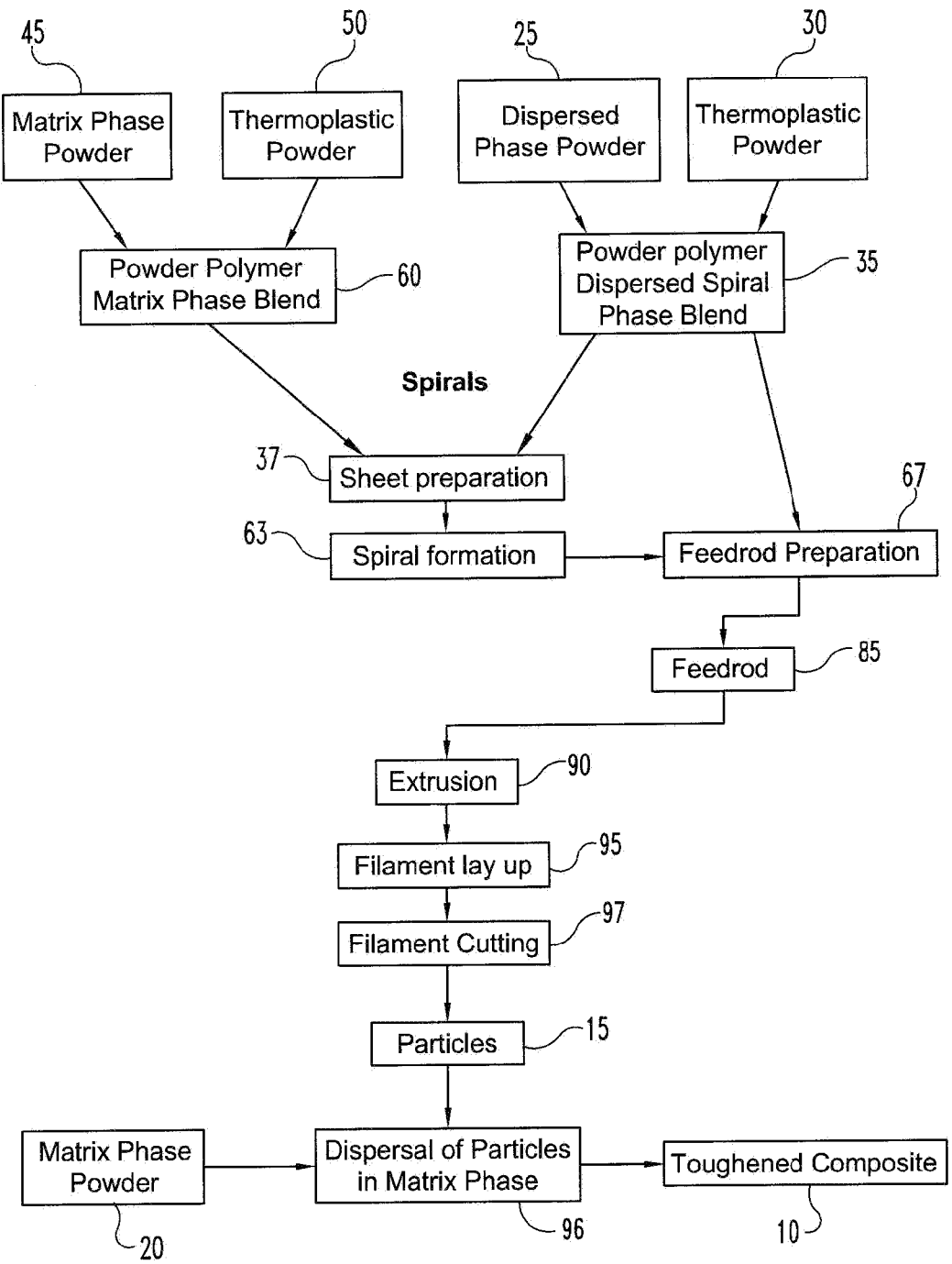
FIG. 6 schematically illustrates a process for making a composite material having spiral silicon carbide members embedded in a zirconium diboride matrix according to a second embodiment of the present novel technology.

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

As generally illustrated in FIGS. 1-11C, the present novel technology relates to a composite material 10 wherein two or more dissimilar materials or phases 15, 20 are combined into an architecture consisting of interpenetrating first phase members 15, each characterized by a predetermined, discrete geometry, such as spirals, dispersed in a second phase matrix 20. This architecture enables the production of high fracture toughness composite materials 10 combining advantageous properties of two or more dissimilar phases 15, 20. In addition to increased fracture toughness, the composite material 10 typically enjoys the enhancement of one or more material properties, tailored through the choice of the individual phases 15, 20 so combined. For example, both thermal shock resistance and oxidation resistance of zirconium diboride 20 are generally improved by the addition of SiC particles 15 having a spiral geometry to the $ZrB_2$ matrix 20. Physical properties of the bulk matrix material 10 such as creep resistance, dielectric behavior, thermal conductivity, electrical conductivity, dielectric constant and the like may also be tailored through the material choice, geometry, and orientation of the added particles of the first phase material 15 having a predetermined geometry or geometries.

The properties of the end composite 10 may be influenced by such factors as the physical properties of their constituent phases 15, 20, the relative concentrations of the constituent phases 15, 20, the orientation of the dispersed phase(s) 15 in the matrix 20, and the like. For example, if the dispersed phase members 15 are properly and substantially uniformly oriented, some of the physical properties of the resultant composite material 10 may be made highly anisotropic; alternately, if the dispersed phase members 15 are randomly oriented, the physical properties of the resultant composite material 10 may still be altered while remaining isotropic. The present novel technology achieves these results in fewer steps than previous coextrusion techniques, allowing for such benefits as increased processing efficiency, reduced production costs, accelerated production of components and the like.

Figure 11A:
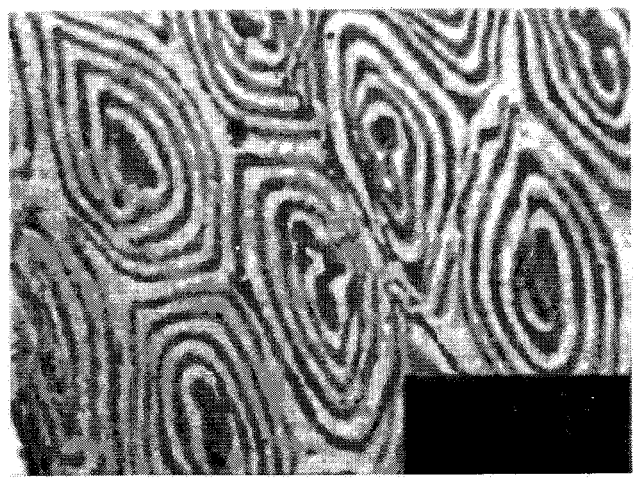
FIG. 11A is a photomicrograph illustrating a composite material having a dispersed second phase characterized by a spiral architecture.
Figure 11B:
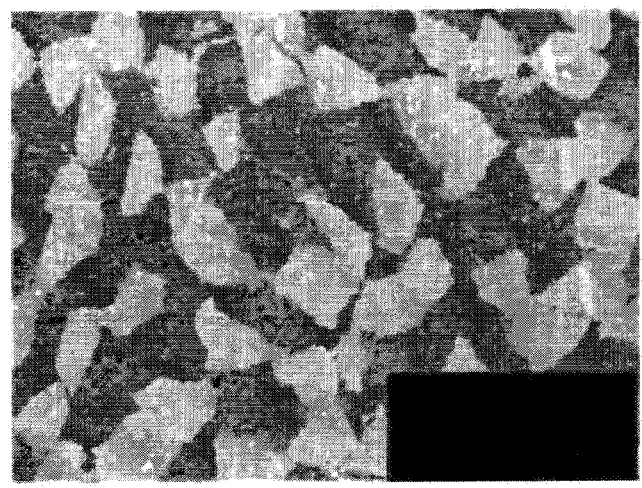
FIG. 11B is a photomicrograph illustrating a composite material having a dispersed second phase characterized by a first alternate geometric architecture.
Figure 11C:
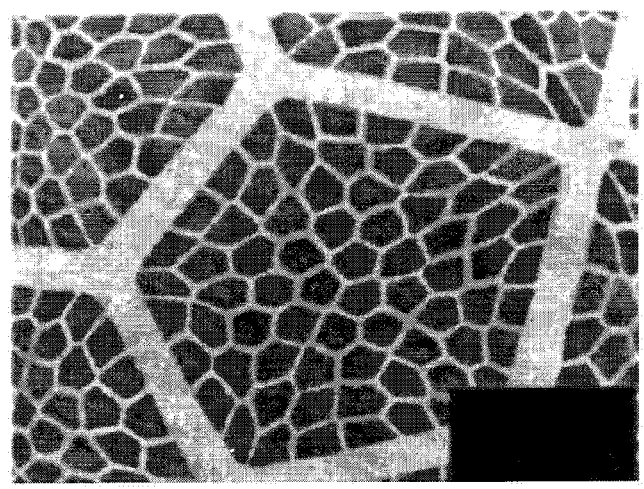
FIG. 11C is a photomicrograph illustrating a composite material having a dispersed second phase characterized by a second alternate geometric architecture.

In one embodiment, the dispersed first phase material 15 may be prepared from powder polymer blends incorporating ceramic or like precursor materials to be formed into predetermined geometric shapes, such as spirals, spheres, cones, cylinders, ellipsoids, cubes, tetrahedrons, parallelepipeds, pyramids, and the like (see FIGS. 11A-C). Such geometric architectures are achieved by mixing between about 40 and about 60 volume percent of a first desired powder material 25 with a thermoplastic polymer 30 suitable for extrusion (see FIG. 1); the about 40 to about 60 volume percent range is typical, although gratifying results may be achieved with compositions outside this range. While in this example the precursor materials 25, 30 are powders, each respective precursor 25, 30 may alternately be introduced in liquid form, granular form, or any convenient form. The ceramic and polymer precursor powders 25, 30 are typically mixed to yield a substantially homogeneous admixture or blend 35 with the ceramic phase 25 dispersed in a polymer matrix 30. Once a substantially homogenous blend 35 has been formed, the dispersed-phase precursor material 35 is typically formed 37 into a sheet 40 of the desired thickness 42. This process is then repeated for a second desired powder material 45 to yield sheets 55 of a second composition 60 (a second desired powder material 45 dispersed in a second thermoplastic resin matrix 50) and characterized by a second desired thickness 62. Typically the second desired composition 60 and the second desired thickness 62 will be different from the respective first desired admixture composition 35 and the first desired thickness 42; however, one or both may be the same. These sheets 40, 55 are then layered one on top of the other (typically with alternating compositions) and rolled up 63, such as from one edge, until a rolled member 65 of the desired diameter is achieved (see FIG. 2). The relative thickness 42, 62 of these sheets, one to another, defines the final geometry 70 of the resultant spiral 80, as well as the number of turns the spiral 80 will consist of for a given diameter. This rolled member 65 is then consolidated 67, typically in a cylindrical die, to form a solid billet or feedrod 85. The feedrod 85 is then extruded 90, typically in one step, in order to obtain a component 95 of the desired diameter (see FIGS. 3 and 4). The extruded filament 95 can then be incorporated into the final product 10, be it as short chopped lengths 97, as continuous lengths of filament 98, or some combination thereof 99. The added first phase particles 97 may be made of any convenient size. Typically, the particles are between about 25 µm and about 2 cm in diameter, but may be made larger or smaller if desired.

FIG. 5 illustrates in tabular form a few possible matrix compositions. The listings in FIG. 5 are not exhaustive, but are instead intended to represent a few example compositions. It should be noted that the matrix 20 and dispersed phases 15 may be of the same material, with only the geometry of the dispersed spiral phases 15 being different.

An example of the procedure for producing a typical composite material 10 is detailed below. In this example, illustrated as FIG. 6, the material 10 is a composite of $ZrB_2$ and SiC, with SiC spirals 15 dispersed in a $ZrB_2$ matrix 20. First, about 54 volume percent $ZrB_2$ powder 25 was blended with a thermoplastic polymer 30 and a small amount of plasticizer 32 (less than 10 volume percent) using a heated high shear mixer until a first homogeneous blend 35 was formed. This process was repeated using (57 volume percent) SiC powder 45 blended with a thermoplastic resin 50 to yield a second homogeneous blend 60. The first and second respective powder polymer blends 35, 60 were then each pressed 37 into respective sheets 40, 55, each with a thickness of about 20 mils, using a heated hydraulic press and shims to control the final thickness. Strips 100, 105 about 3 inches wide by about 8 inches long were then cut from each respective sheet 40, 55. The SiC strip 105 was placed atop of the $ZrB_2$ strip 100 and heated 107 to ~130° C. on a heated platen. After the material became pliable, the strips 100, 105 were rolled up 63 from one end to yield a rolled member or rod 65 characterized by the spiral architecture. The rod 65 was then placed in a die of about 0.86 inches in diameter, heated to 130° C., and consolidated 67 into a feedrod 85 using a hydraulic press. Using an extruder, the feedrod 85 was then passed through a heated spinneret 90 reducing the diameter to about 300 microns to yield a filament 98 while maintaining the original geometry of the spiral feedrod 85. The filament 98 was chopped into 1 mm lengths 97 which were then mixed with additional $ZrB_2$ powder 20 in order to form a mixture 110 that contained about 30 volume percent SiC. This mixture 110 was hot-pressed in order to form the final $ZrB_2$-matrix billet 10 containing 30 volume percent SiC spirals. The amount of second phase material 15 added could vary widely from about 5 to about 95 volume percent. The choice of how much of the first phase material 15 is desired to be added to the second phase matrix 20 to produce a desired and advantageous result would depend on the physical property of properties being manipulated. For mechanical properties, a range of between about 20 and about 40 volume percent would typically be selected. For the manipulation of electrical or thermal properties, a range of between about 5 and about 25 volume percent would typically be appropriate.

Figure 7A:
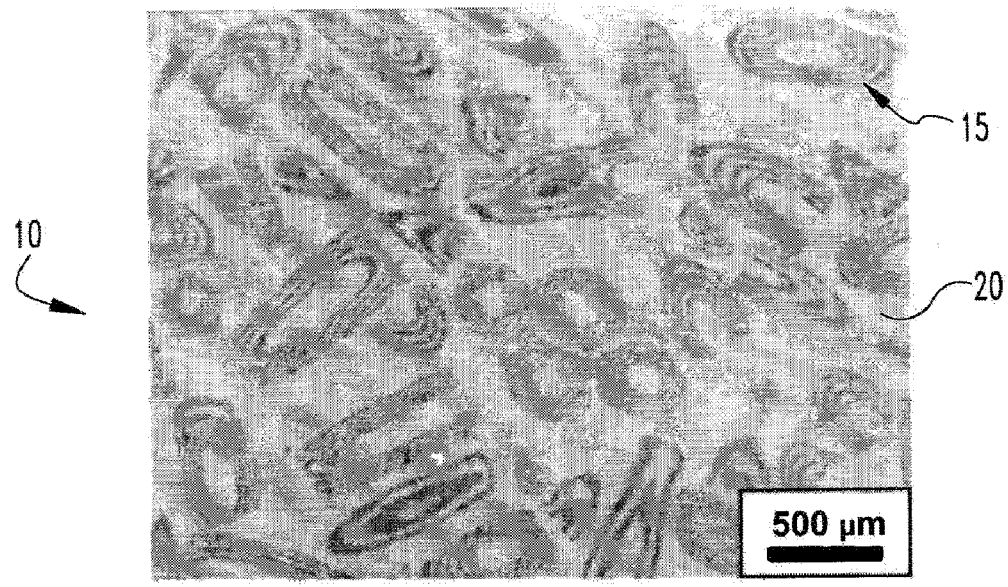
FIG. 7A is a photomicrograph illustrating a first composite composition of the present novel technology fired to 1900 degrees.
Figure 7B:
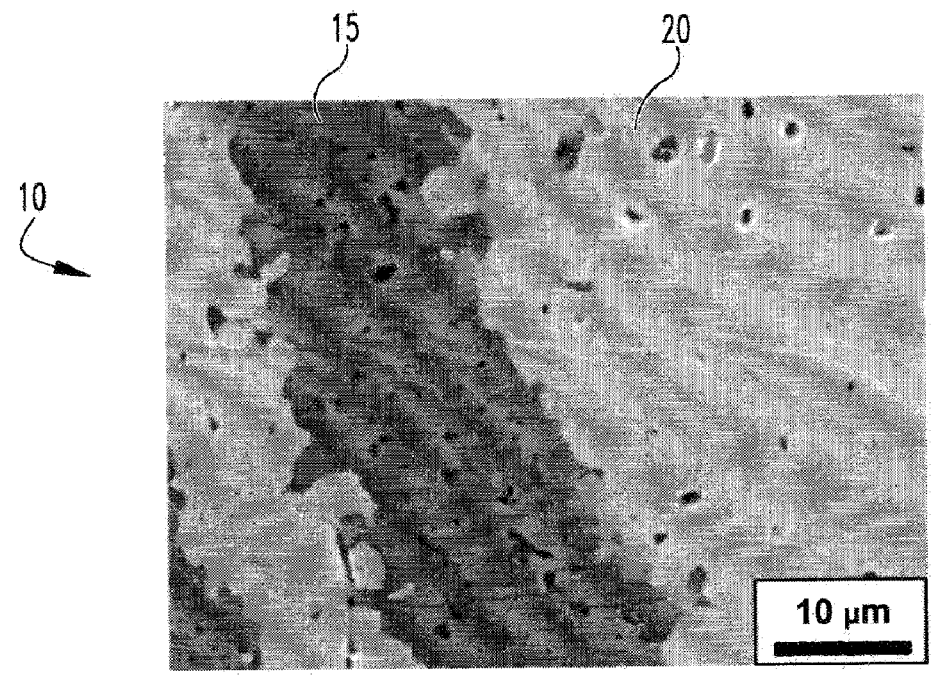
FIG. 7B is a photomicrograph illustrating a first composite composition of the present novel technology fired to 2000 degrees.
Figure 7C:
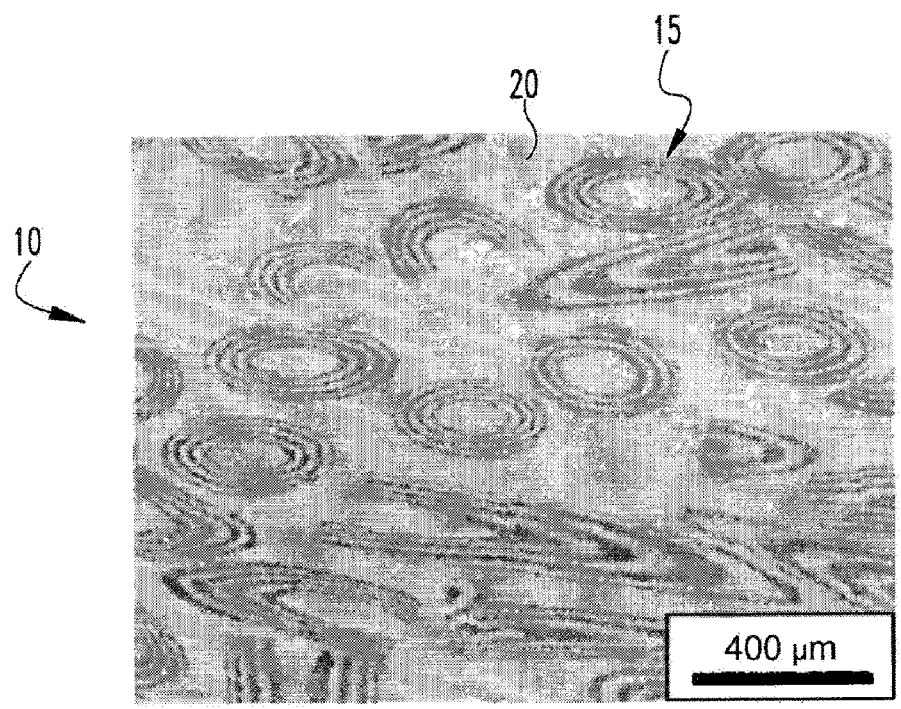
FIG. 7C is a photomicrograph illustrating a third composite composition of the present novel technology.
Figure 7D:
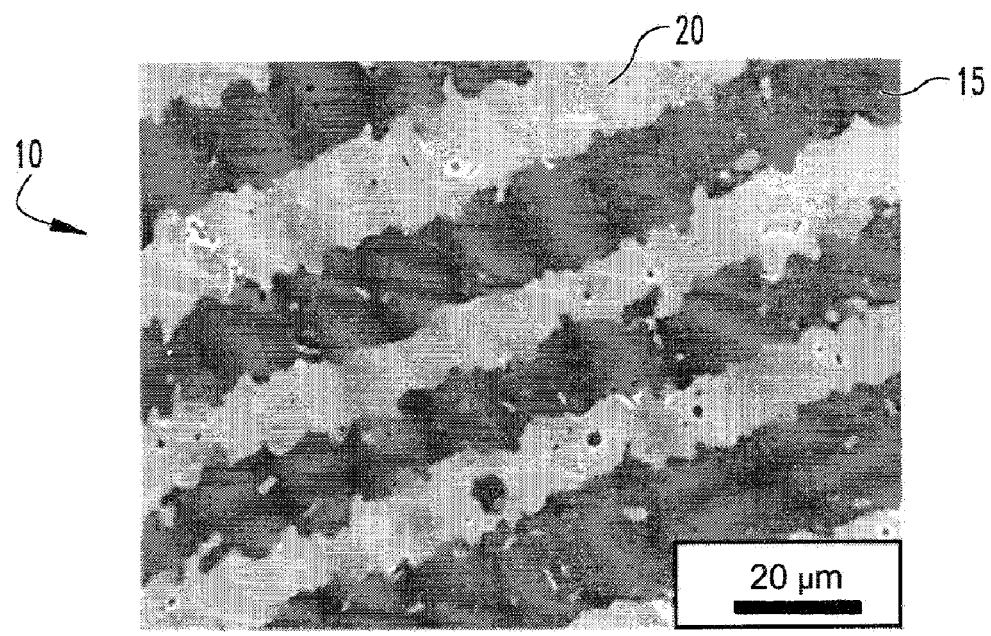
FIG. 7D is an enlarged photomicrographic view of the embodiment of FIG. 7C.
Figure 8A:
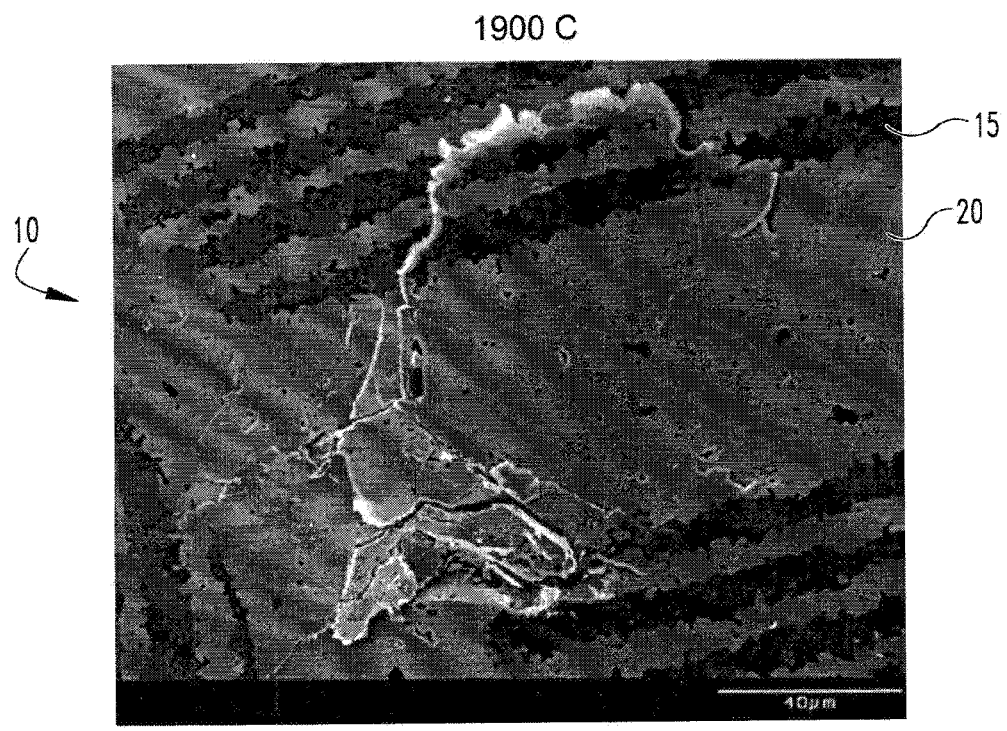
FIG. 8A is a first photomicrograph illustrating crack propagation in the composition of FIG. 7A.
Figure 8B:
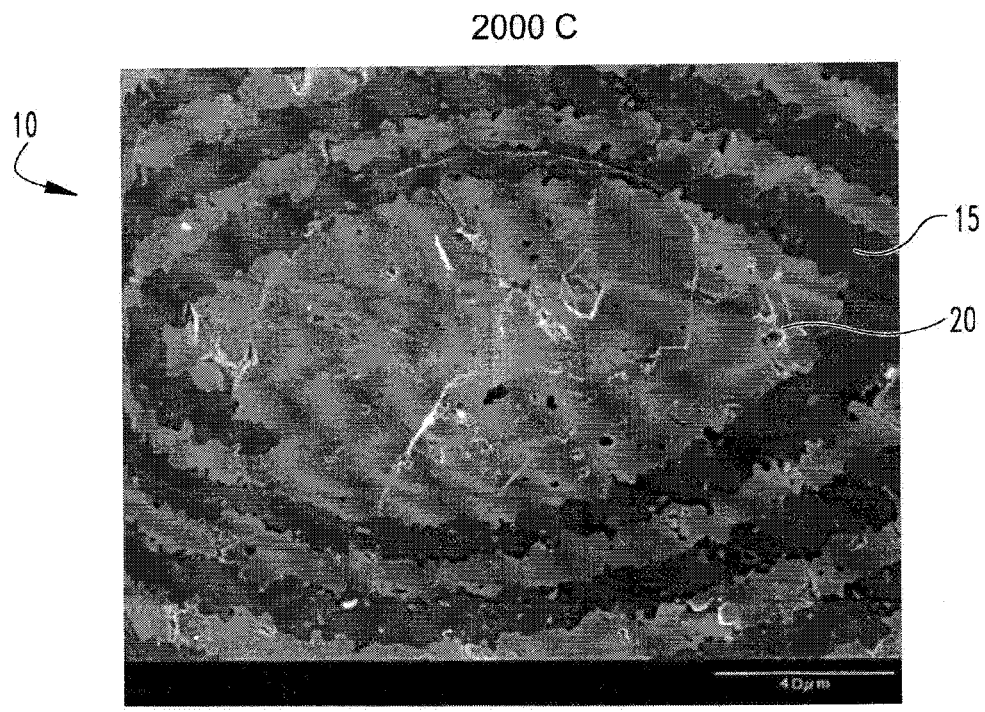
FIG. 8B is a second photomicrograph illustrating crack propagation in the composition of FIG. 7A.
Figure 8C:
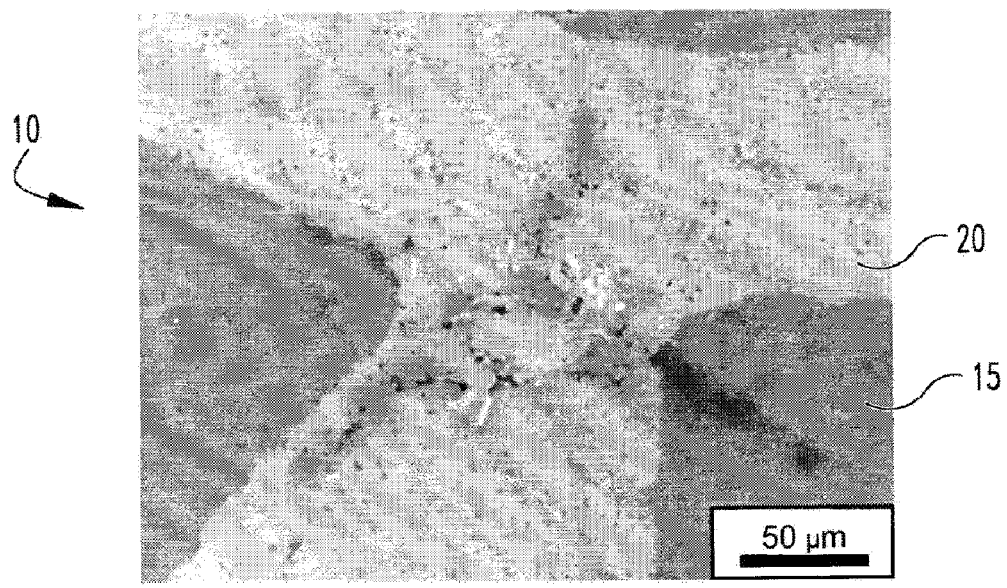
FIG. 8C is a third photomicrograph illustrating crack propagation in the composition of FIG. 7A.
Figure 8D:
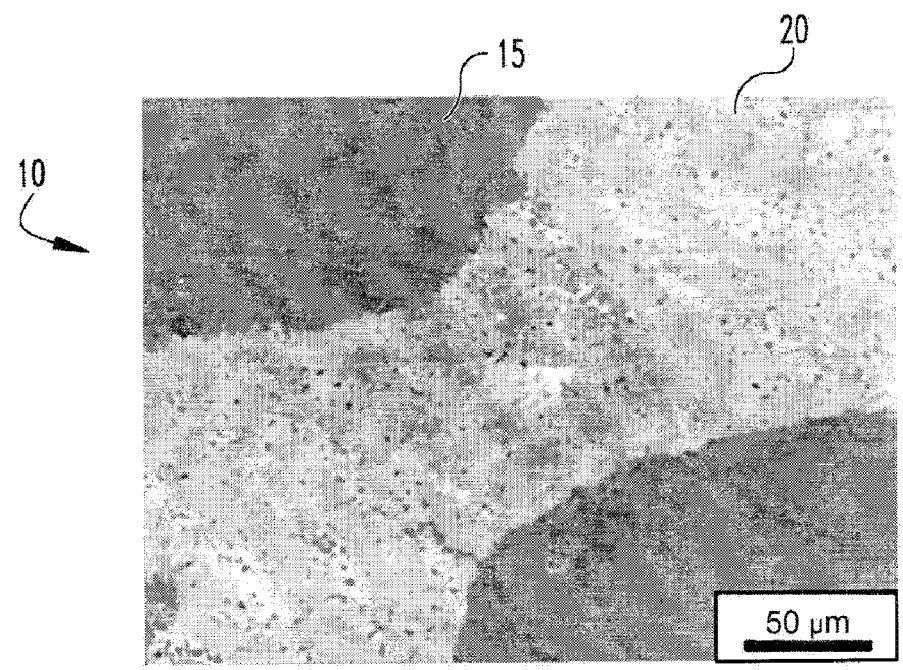
FIG. 8D is a fourth photomicrograph illustrating crack propagation in the composition of FIG. 7A.
Figure 9:
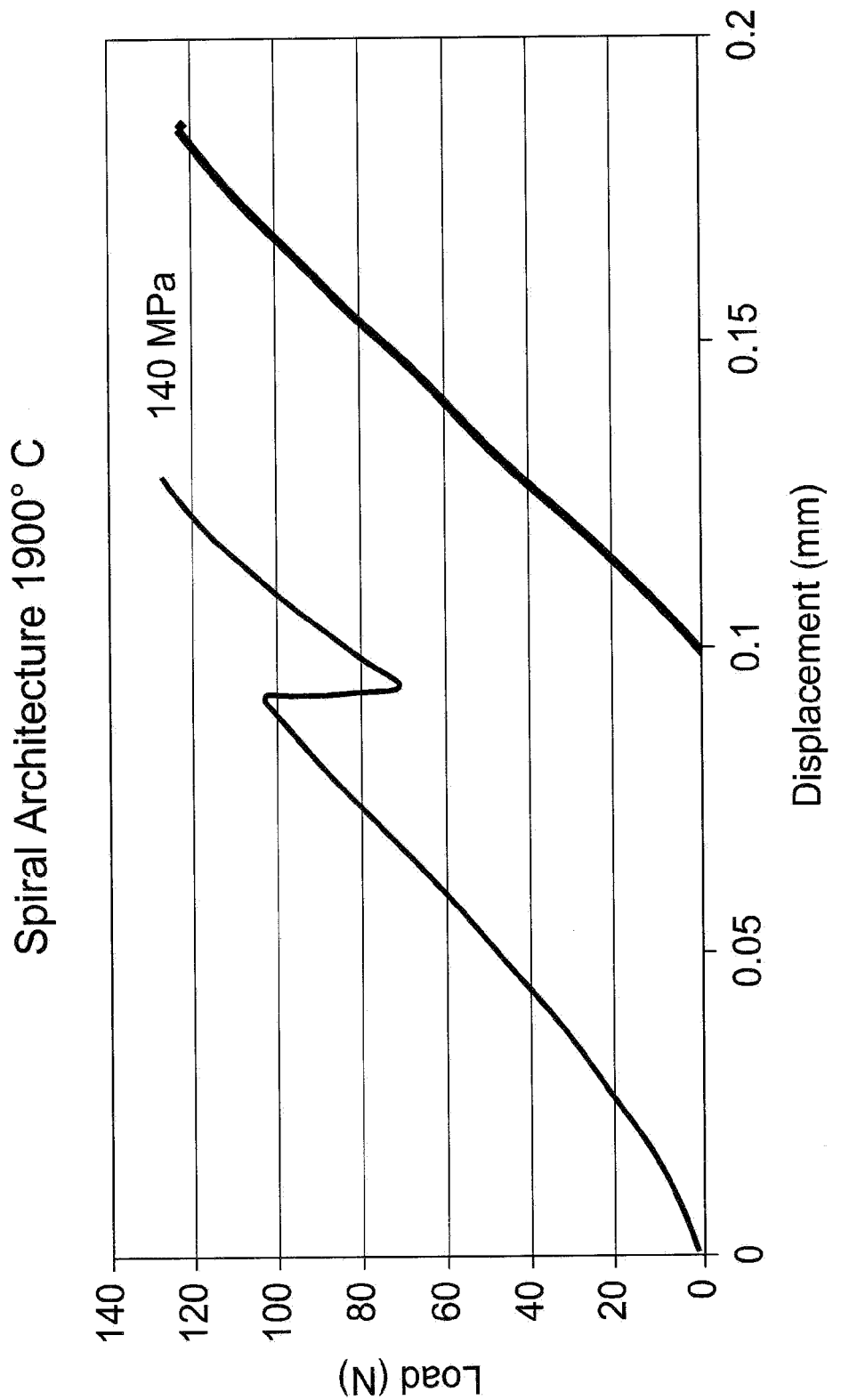
FIG. 9 is a first graph illustrating the toughness of a composite material having a dispersed spiral phase.
Figure 10:
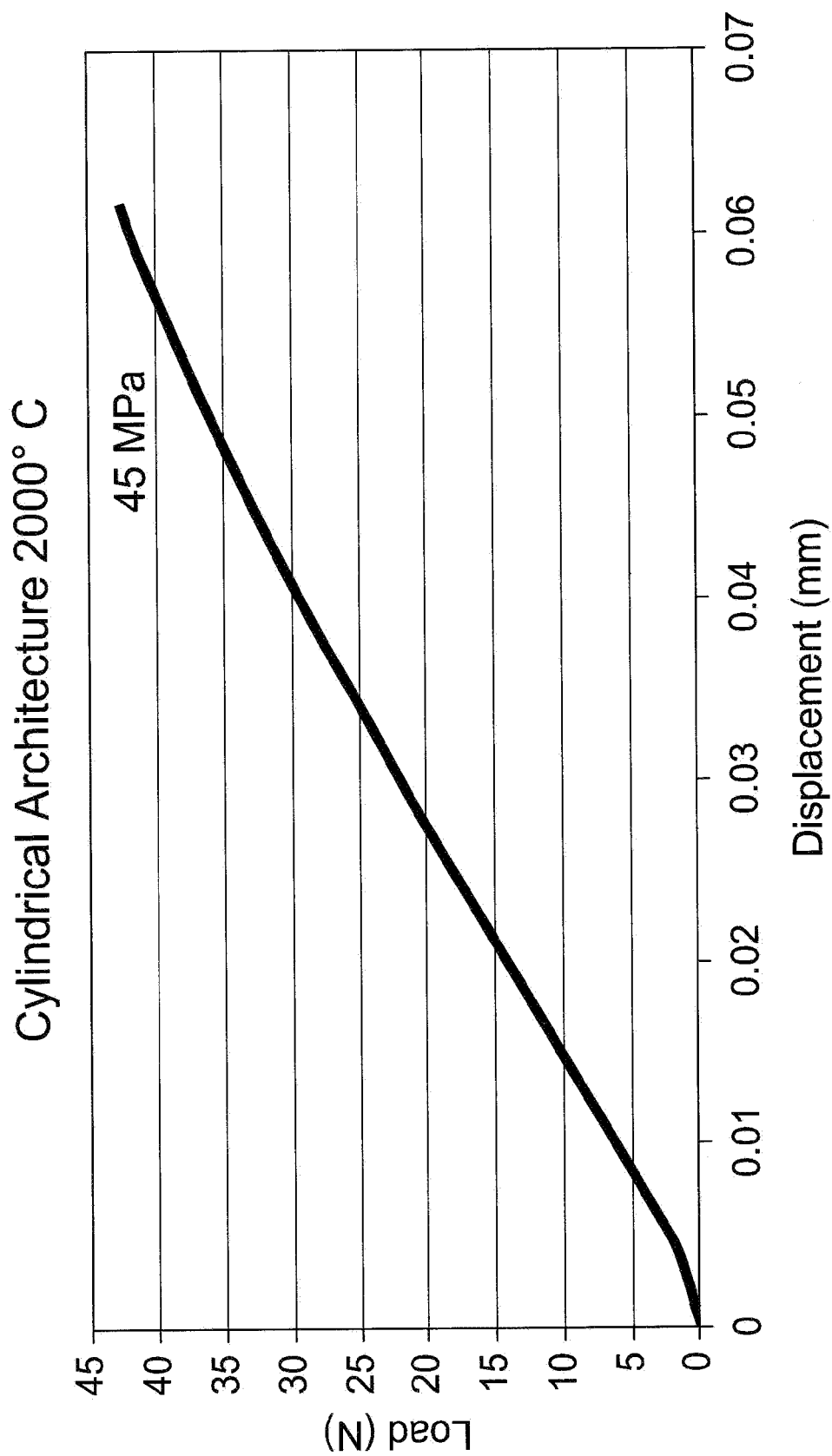
FIG. 10 is a second graph illustrating the toughness of a composite material having a dispersed cylindrical phase.

FIGS. 7A and 7B are photomicrographs illustrating the dispersed first phase spirals 15 in the second phase matrix 20. FIGS. 8A-8D are photomicrographs graphically illustrating the crack propagation deflection and attenuation properties of the composite materials 10. As can be seen, crack propagation is blunted by first phase spiral particles 15, with the crack either stopped or redirected. FIGS. 9 and 10 graphically illustrate the increase in toughness of the composite material 10 over a test material. Typically, the dispersed first phase 15 is characterized by a spiral architecture, although other geometries (cylinders and the like) may likewise prove advantageous. Likewise, the first and/or second phase 15, 20 may be ceramic, but may also be metallic, polymeric, vitreous, amorphous or the like.

Crack defection can occur for multiple reasons. Often times in ceramics propagating cracks may be deflected or attenuated by running into to a difference in elastic modulus between two phases; likewise, deflection may occur at the interface between two phases when the interface is weaker than either phase. The tensile stresses generated at the interface between two phases of dissimilar thermal expansions can also draw a crack along the interface as opposed to allowing it to propagate across the interface. Differences in fracture toughness between two phases can also lead to crack deflection as a crack tries to propagate from the low toughness phase into the high toughness phase.

While the novel technology has been illustrated and described in detail in the drawings and foregoing description, the same is to be considered as illustrative and not restrictive in character, it being understood that only the preferred embodiment has been shown and described and that all changes and modifications that come within the spirit of the novel technology are desired to be protected.

We claim:

1. A silicon carbide toughened zirconium diboride composite material, comprising:
   a zirconium diboride matrix; and
   a plurality of substantially spiral silicon carbide/zirconium diboride composite particles dispersed therein.

2. The toughened zirconium diboride composite material of claim 1, wherein the respective substantially spiral silicon carbide/zirconium diboride composite particles each have an interspiral width between about 0.1 microns to about 100 microns, and wherein each respective substantially spiral silicon carbide particle has an overall diameter of between about 25 microns and about 2 centimeters.

3. The toughened zirconium diboride composite material of claim 1, wherein the plurality of dispersed silicon carbide/zirconium diboride composite particles deflect and attenuate crack propagation.

4. The toughened zirconium diboride composite material of claim 1 wherein the respective spiral silicon carbide/zirconium diboride particles have outer zirconium diboride portions bonded to the zirconium diboride matrix.

* * * * *